(12) United States Patent
Liebman

(10) Patent No.: US 8,477,460 B1
(45) Date of Patent: Jul. 2, 2013

(54) DISK DRIVE INCLUDING AN ACTUATOR LATCH HAVING A DEFEAT POSITION

(75) Inventor: Michael K. Liebman, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 561 days.

(21) Appl. No.: 12/562,952

(22) Filed: Sep. 18, 2009

Related U.S. Application Data

(62) Division of application No. 11/494,239, filed on Jul. 27, 2006, now Pat. No. 7,610,672.

(51) Int. Cl.
G11B 33/14 (2006.01)
G11B 5/54 (2006.01)
G11B 21/22 (2006.01)

(52) U.S. Cl.
USPC ............... 360/256.2; 360/256; 360/97.02

(58) Field of Classification Search
USPC .................. 360/256, 97.02, 256.2, 256.1
See application file for complete search history.

(56) References Cited

U.S. PATENT DOCUMENTS

| | | | |
|---|---|---|---|
| 4,692,829 A | 9/1987 | Campbell |
| 4,796,130 A | 1/1989 | Shimanuki |
| 4,881,139 A | 11/1989 | Hazebrouck |
| 5,363,261 A | 11/1994 | Eckberg et al. |
| 5,365,389 A | 11/1994 | Jabbari et al. |
| 5,369,538 A | 11/1994 | Moe et al. |
| 5,404,257 A | 4/1995 | Alt |
| 5,455,726 A | 10/1995 | Liu |
| 5,483,399 A | 1/1996 | Jeong et al. |
| 5,543,986 A | 8/1996 | Albrecht |
| 5,600,516 A | 2/1997 | Phillips et al. |
| 5,659,449 A | 8/1997 | Brooks, Jr. et al. |
| 5,668,683 A | 9/1997 | Stone |
| 5,734,527 A | 3/1998 | Reinhart |
| 5,768,058 A | 6/1998 | Hofland |
| 5,793,572 A | 8/1998 | Lalouette et al. |
| 5,870,256 A | 2/1999 | Khanna et al. |
| 6,028,746 A | 2/2000 | Matsumura |
| 6,118,636 A | 9/2000 | Hatch et al. |
| 6,134,077 A | 10/2000 | Misso et al. |
| 6,163,440 A | 12/2000 | Takahashi et al. |
| 6,185,074 B1 | 2/2001 | Wang et al. |
| 6,215,628 B1 | 4/2001 | Boutaghou |
| 6,252,745 B1 | 6/2001 | McReynolds et al. |

(Continued)

OTHER PUBLICATIONS

Office Action dated Nov. 14, 2008 from U.S. Appl. No. 11/494,239, 5 pages.

(Continued)

*Primary Examiner* — Julie Anne Watko

(57) ABSTRACT

There is provided a disk drive that includes a base, a limiting member, an actuator, and a latch. The actuator includes an actuator catch with a catch path. The latch contacts the limiting member with the latch in an open position. The latch is biased to rotate to a defeat position. An arresting portion is in the catch path with the latch in a closed position. The arresting portion is not in the catch path with the latch in the open position, and not in the catch path with the latch in the defeat position. A crash stop portion contacts the actuator with the latch in the closed position and with the actuator in a stop position. The crash stop portion does not contact the actuator with the latch in the defeat position.

13 Claims, 15 Drawing Sheets

U.S. PATENT DOCUMENTS

| | | |
|---|---|---|
| 6,327,119 B1 | 12/2001 | Barina et al. |
| 6,339,521 B1 | 1/2002 | Durrum et al. |
| 6,381,102 B1 | 4/2002 | Strom et al. |
| 6,400,533 B1 | 6/2002 | Liu et al. |
| 6,501,624 B1 | 12/2002 | Gillis et al. |
| 6,507,461 B1 | 1/2003 | Kimura et al. |
| 6,529,349 B1 | 3/2003 | Byun et al. |
| 6,535,357 B1 | 3/2003 | Misso et al. |
| 6,535,358 B1 | 3/2003 | Hauert et al. |
| 6,535,359 B1 | 3/2003 | Boutaghou |
| 6,574,073 B1 | 6/2003 | Hauert et al. |
| 6,600,515 B2 | 7/2003 | Bowyer et al. |
| 6,624,980 B1 | 9/2003 | Watson et al. |
| 6,650,507 B2 | 11/2003 | Nelson et al. |
| 6,710,980 B1 | 3/2004 | Hauert et al. |
| 6,731,468 B2 | 5/2004 | Williams et al. |
| 6,744,604 B2 | 6/2004 | Misso |
| 7,061,723 B2 | 6/2006 | Price |
| 7,564,654 B2 * | 7/2009 | Kim et al. .................. 360/256.4 |
| 7,610,672 B1 | 11/2009 | Liebman |
| 7,616,407 B2 * | 11/2009 | Nesori et al. ............... 360/256.2 |
| 7,684,155 B1 | 3/2010 | Huang et al. |
| 7,684,156 B2 * | 3/2010 | Okutomi et al. ........... 360/256.2 |
| 7,715,149 B1 | 5/2010 | Liebman et al. |
| 7,957,102 B1 | 6/2011 | Watson et al. |
| 8,081,401 B1 | 12/2011 | Huang et al. |
| 2002/0044386 A1 | 4/2002 | Koyanagi et al. |
| 2002/0135944 A1 | 9/2002 | Misso |
| 2003/0035246 A1 | 2/2003 | Byun et al. |
| 2004/0027726 A1 * | 2/2004 | Hong et al. .................. 360/256 |
| 2004/0141256 A1 | 7/2004 | Hong et al. |
| 2004/0145831 A1 | 7/2004 | Kanada et al. |
| 2004/0145832 A1 | 7/2004 | Kanada et al. |
| 2004/0257709 A1 | 12/2004 | Lee et al. |
| 2005/0264941 A1 | 12/2005 | Tsuda et al. |
| 2007/0146937 A1 | 6/2007 | Akama et al. |
| 2008/0180853 A1 * | 7/2008 | Son et al. .................. 360/256.2 |

OTHER PUBLICATIONS

Office Action dated Dec. 18, 2008 from U.S. Appl. No. 11/494,239, 14 pages.

Notice of Allowance dated Jun. 17, 2009 from U.S. Appl. No. 11/494,239, 7 pages.

Interview Summary dated Jul. 28, 2009 from U.S. Appl. No. 11/494,239, 2 pages.

* cited by examiner

US 8,477,460 B1

DISK DRIVE INCLUDING AN ACTUATOR LATCH HAVING A DEFEAT POSITION

CROSS REFERENCE TO RELATED APPLICATION

This application is a divisional of U.S. patent application Ser. No. 11/494,239, filed Jul. 27, 2006, which is incorporated by reference herein in its entirety.

FIELD OF THE INVENTION

The present invention relates generally to disk drives, and in particular a disk drive with an actuator latch having a defeat position.

BACKGROUND

The typical hard disk drive includes a head disk assembly (HDA) and a printed circuit board assembly (PCBA) attached to a disk drive base of the HDA. The HDA includes at least one disk, a spindle motor for rotating the disk, and a head stack assembly (HSA). The PCBA includes a disk controller for generating servo control signals. The HSA includes a head for reading and writing data from and to the disk. The HSA is controllably positioned in response to the generated servo control signals from the disk controller to move the head relative to tracks of the disk.

The HSA includes an actuator assembly, at least one head gimbal assembly (HGA), and a flex cable assembly. The actuator assembly typically includes an actuator having an actuator body with one or more actuator arms extending from the actuator body. Each actuator arm supports the HGA that includes a head. An actuator coil is supported by the actuator body. The actuator coil interacts with a magnet to form a voice coil motor. The PCBA controls current passing through the actuator coil that results in a torque being applied to the actuator. The HSA further includes the flex cable assembly in electrical communication with the PCBA. The flex cable assembly supplies current to the coil and carries signals between the head and the PCBA.

A latching mechanism is provided to retain the actuator in a parked position when the heads are not being used to interact with the tracks on the disk. In the parked position, the actuator is positioned with the heads either at an inner diameter (ID) of the disk or at or beyond an outer diameter (OD) of the disk such as upon a ramp. A crash stop coupled to the disk drive base is provided to limit rotation of the actuator in a given direction. The crash stop is configured to contact a portion of the actuator when the actuator is rotated in a given rotational direction. Another crash stop may be provided to limit actuator rotation in an opposite rotational direction. The latching mechanism may additionally function as one of the crash stops.

Disk drives have found an ever increasing utility in small mobile electronic devices. Such devices may include laptop and hand-held computing devices, audio devices, audio/video devices, and personal electronic organizers, for examples.

Due to the portable nature of such small mobile electronic devices, there is an enhanced risk that the device may be subject to mechanical shock events. This may occur in the case where the device is dropped for example. During a mechanical shock event, the disk drive base may experience significant rotational acceleration that can cause a sudden relative rotation of the actuator. Such sudden relative rotation of the actuator may result in damage to the actuator, especially the attached head gimbal assemblies. The adjacent disk(s) may be impacted as well, which may result in loss of data. Various latch designs have attempted to secure the actuator during such mechanical shock events. However, many such designs have proven to be complex, costly or unreliable. In addition, it is desirable to have the ability to readily remove the actuator from the disk drive for purposes of reworking and/or replacing the actuator without having to first remove the latch.

Accordingly, there is need in the art for an improved actuator latch or latch/crash stop configuration that facilitates installation, removal, or replacement of the actuator.

SUMMARY

According to an aspect of the present invention, there is provided a disk drive. The disk drive includes a disk drive base, a fixed limiting member coupled to the disk drive base, an actuator rotatably coupled to the disk drive base, and an actuator latch. The actuator includes an actuator catch, and rotation of the actuator defines an arcuate catch path of the actuator catch. The actuator latch is rotatably coupled to the disk drive base. The latch is in contact with the fixed limiting member with the latch in an open position. The latch is biased to rotate from the open position to a defeat position. The latch includes a latch arresting portion and a crash stop portion. The latch arresting portion is disposed in the catch path with the latch in a closed position. The latch arresting portion is not in the catch path with the latch in the open position, and the latch arresting portion is not in the catch path with the latch in the defeat position. The crash stop portion is in contact with the actuator with the latch in the closed position and with the actuator in a stop position. The crash stop portion is not in contact with the actuator with the latch in the defeat position.

According to another aspect of the present invention, there is provided a method of reworking a disk drive. The method includes removing a fixed limiting member from the disk drive during a reworking period. The method further includes allowing a latch to biasedly move to a defeat position from an open position during the period. The method further includes removing a first actuator from the disk drive including translating the first actuator in a direction parallel to an actuator axis of rotation of the first actuator during the period. The method further includes replacing the first actuator with a replacement actuator into the disk drive including translating the replacement actuator in a direction parallel to an actuator axis of rotation of the replacement actuator during the period. The latch is never removed from the disk drive during the period.

DESCRIPTION OF THE PREFERRED EMBODIMENTS

Figure 1:
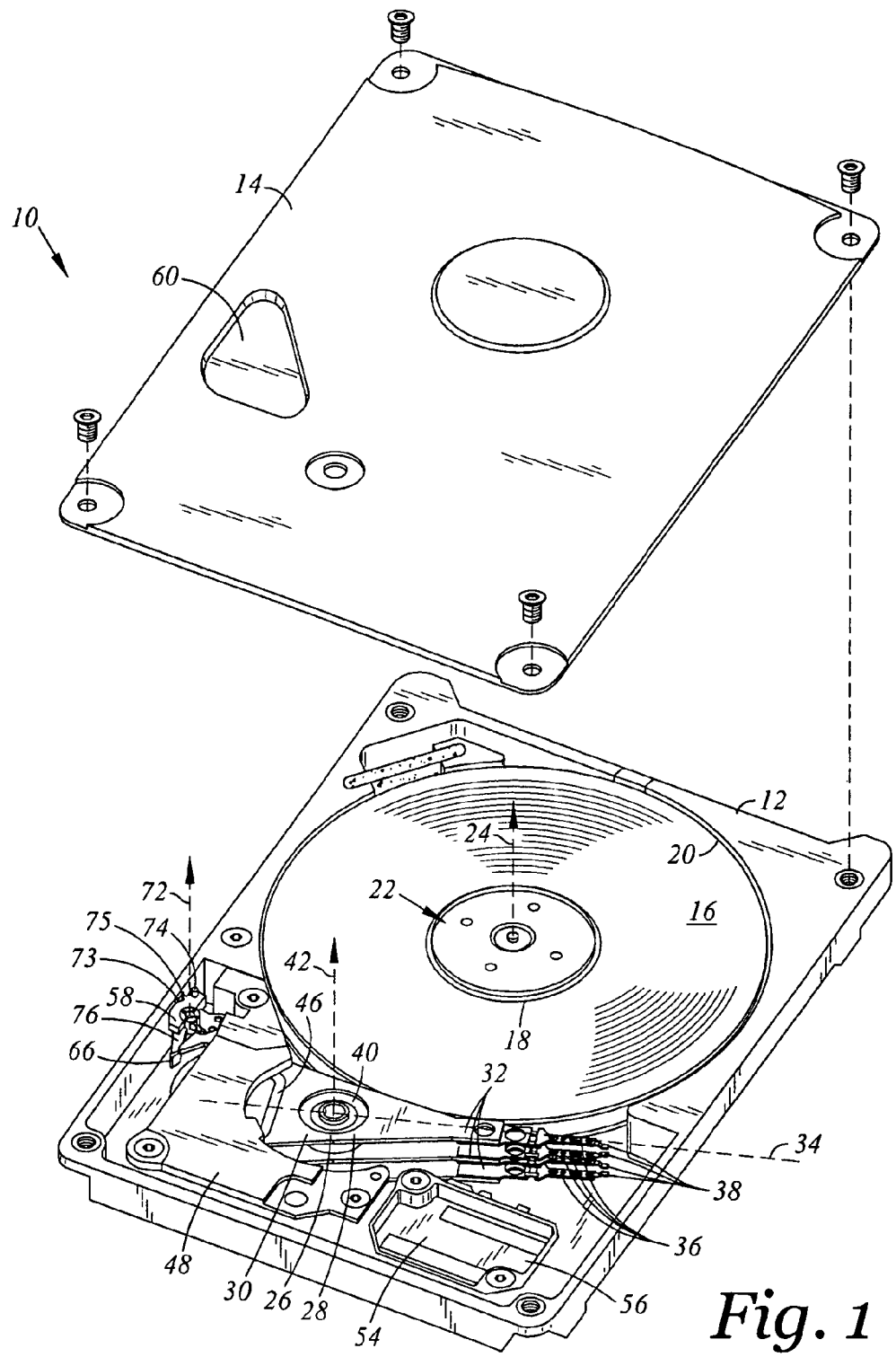
FIG. 1 is a top perspective view of a disk drive (with a cover exploded from a remainder of the disk drive) including an actuator latch (in a closed position) and an actuator (in a stop position) according to an embodiment of the present invention.
Figure 2:
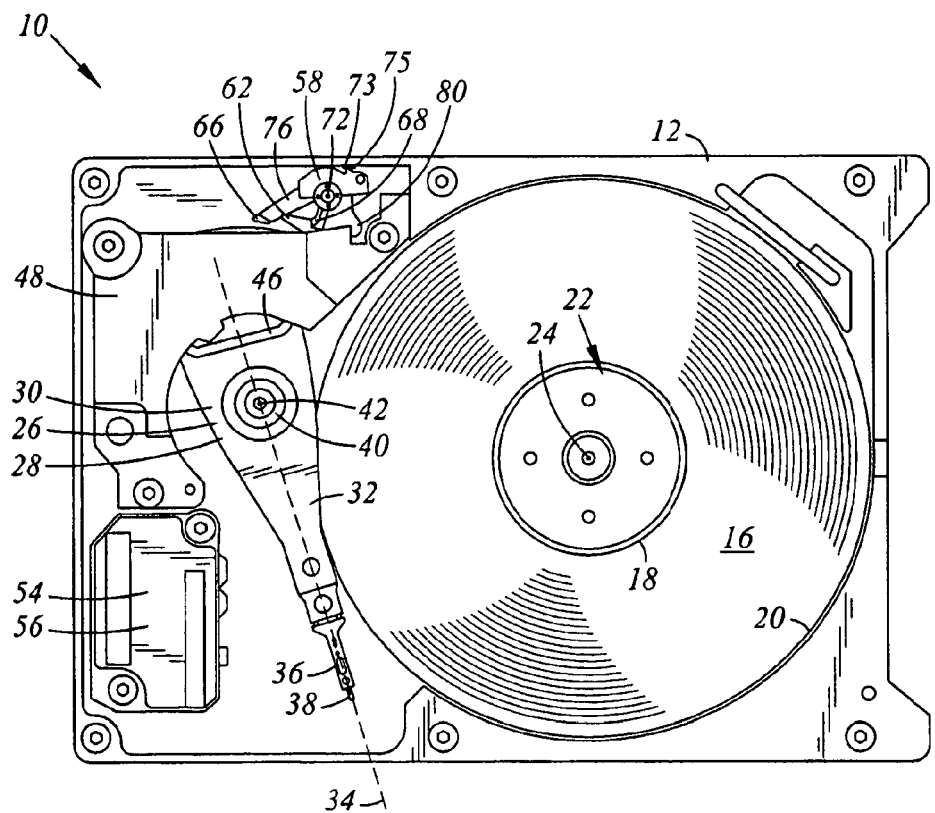
FIG. 2 is a top plan view of the disk drive of FIG. 1 (without the cover shown)

Referring now to FIGS. 1 and 2, there is respectively depicted a top perspective view and a top plan view of a disk drive 10 capable of incorporating an embodiment of the present invention (details of which are discussed below and shown in additional figures). The disk drive 10 includes a head disk assembly (HDA) and a printed circuit board assembly (PCBA) (not shown). The head disk assembly includes a disk drive housing having disk drive housing members, such as a disk drive base 12 and a cover 14 (not shown in FIG. 2 for ease of illustration of the internal disk drive components). The disk drive base 12 and the cover 14 collectively house disks 16. A single disk or multiple disks may be utilized. Each disk 16 includes an inner diameter (ID) 18 and an outer diameter (OD) 20. Each disk 16 further includes a plurality of tracks for storing data. Each disk 16 may store data by magnetic, magneto-optical, or optical means. The head disk assembly further includes a spindle motor 22 for rotating the disks 16 about a disk rotation axis 24. The head disk assembly further includes a head stack assembly 26 rotatably attached to the disk drive base 12 in operable communication with the disks 16. The head stack assembly 26 includes an actuator 28 and heads 38.

The actuator 28 includes an actuator body 30 and actuator arms 32 that extend from the actuator body 30. For angular reference purposes, each actuator arm 32 may define an actuator arm longitudinal axis 34 with the actuator 28 in a stop or parked position. Distally attached to the actuator arms 32 are suspension assemblies 36. The suspension assemblies 36 respectively support heads 38. The suspension assemblies 36 with the heads 38 are referred to as head gimbal assemblies. It is contemplated that the number of actuator arms and suspension assemblies may vary depending upon the number of disks and disk surfaces utilized.

Each head 38 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 38 is disposed adjacent to the various data annular regions from adjacent to the outer diameter 20 to the inner diameter 18 of the disk 16. In the embodiment shown, the actuator body 30 includes a bore, and the actuator 28 further includes a pivot bearing cartridge 40 engaged within the bore for facilitating the actuator body 30 to rotate between limited angular positions about an axis of rotation 42.

Figure 5:
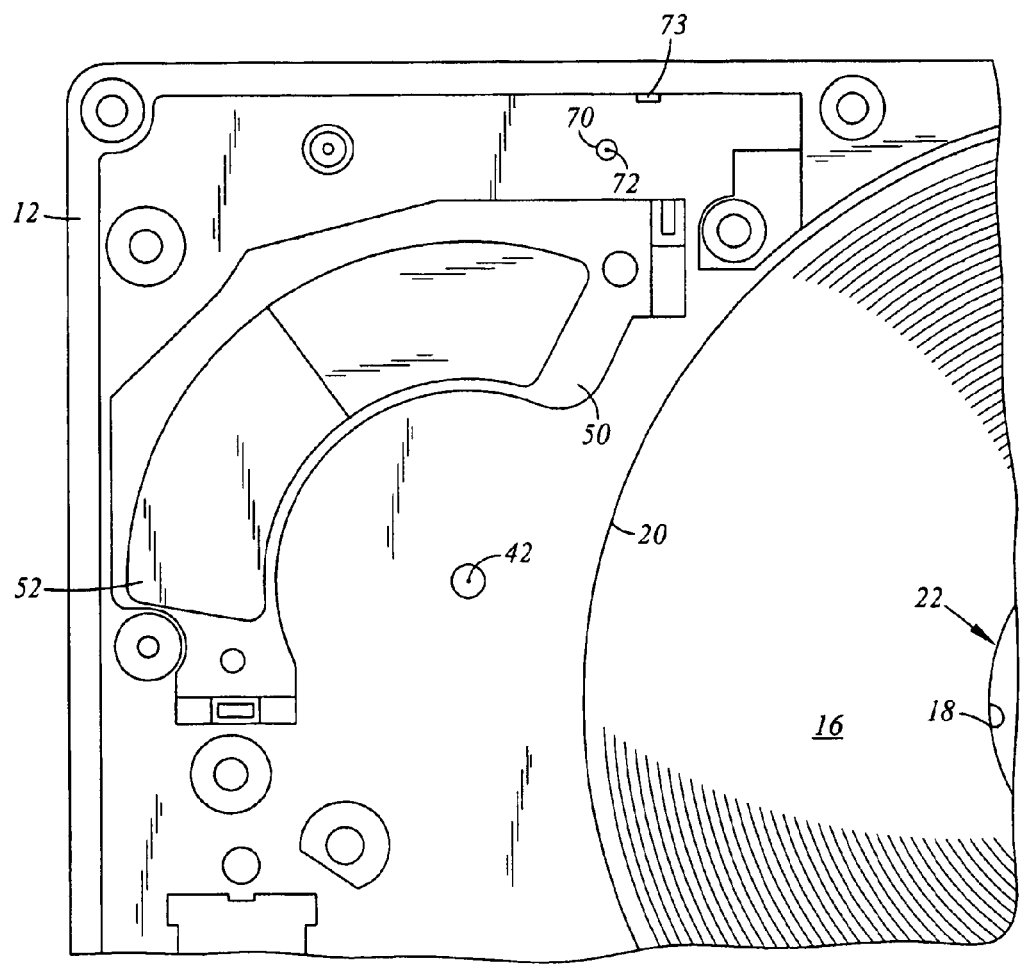
FIG. 5 is a top plan view of a portion of the disk drive of FIG. 1 prior to installation of the actuator latch, the actuator, a VCM top plate and the cover.
Figure 6:
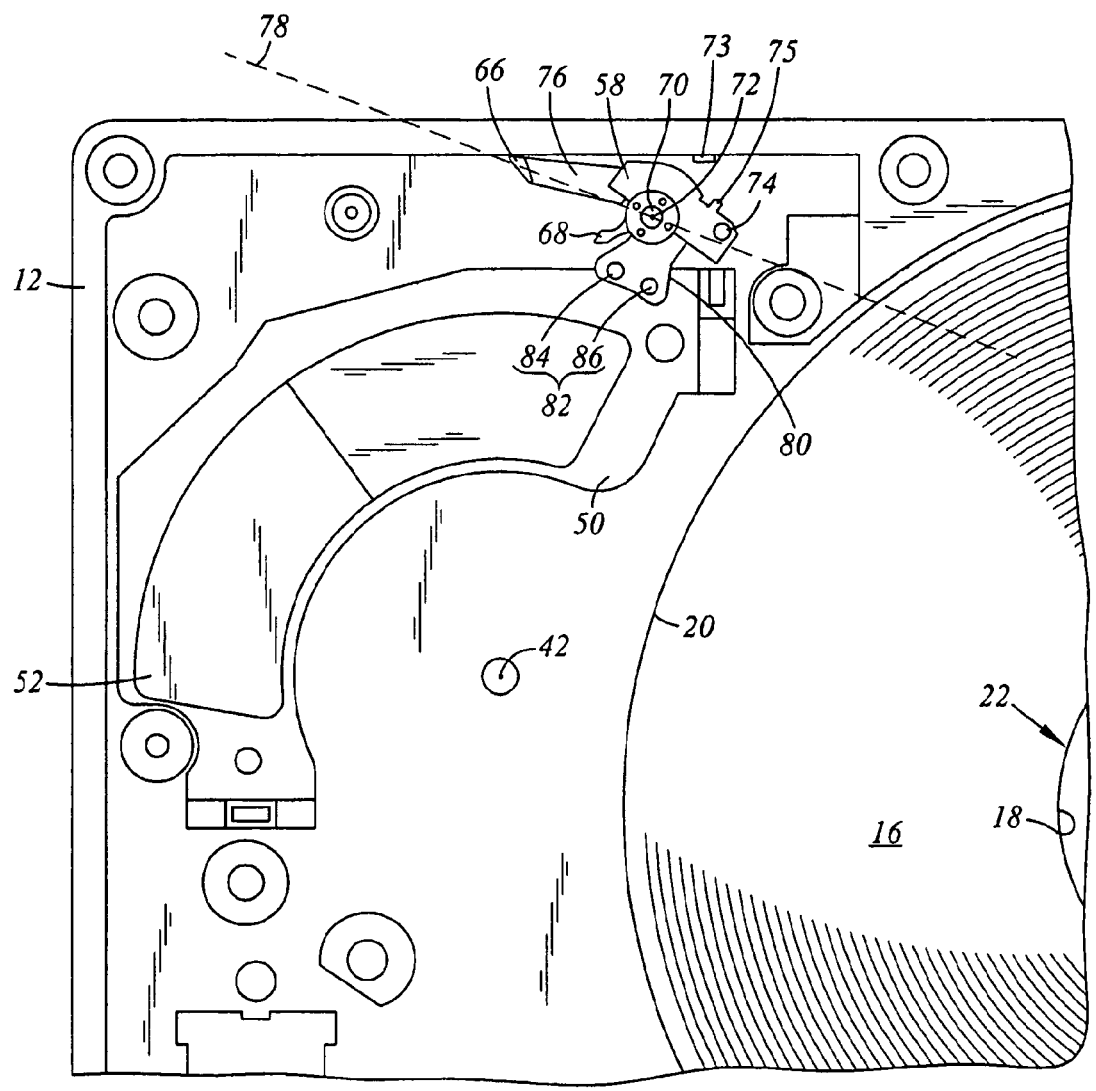
FIG. 6 is the top plan view of the portion of the disk drive of FIG. 5, however, with the actuator latch installed in a defeat position.
Figure 7:
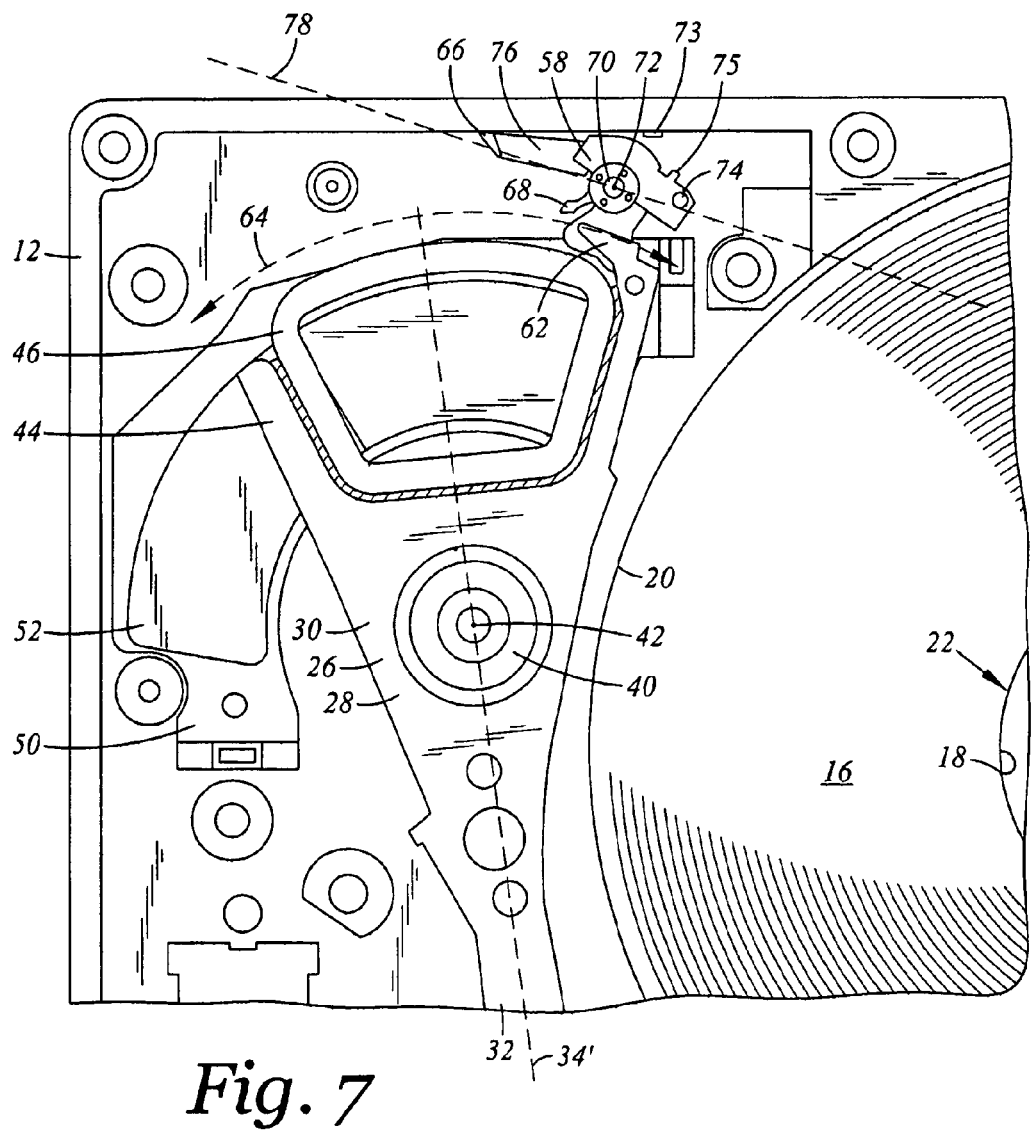
FIG. 7 is the top plan view of the portion of the disk drive of FIG. 6, however, with the actuator installed.

As seen in FIG. 7, the actuator 28 further includes a coil support element 44 that extends from one side of the actuator body 30 opposite the actuator arms 32. The coil support element 44 is configured to support a coil 46. A top VCM plate 48 may be provided as shown in FIGS. 1 and 2. The top VCM plate 48 is not shown in FIGS. 3-13 so as to ease illustration of the other disk drive components. A bottom VCM plate 50 with an attached VCM magnet 52 may also be provided as can be seen in FIGS. 5-13. The coil 46 is positioned between the VCM magnet 52 and the top VCM plate 48 to form a voice coil motor for controllably rotating the actuator 28.

The head stack assembly 26 further includes a cable connector 56 and a flex cable assembly 54 that includes, for example, a flex cable and pre-amplifier circuitry (not shown for clarity in illustration of the actuator 26). The cable connector 56 is attached to the disk drive base 12 and is disposed in electrical communication with the printed circuit board assembly. The flex cable assembly 54 supplies current to the coil 46 and carries signals between the heads 38 and the printed circuit board assembly.

With this configuration, current passing through the coil 46 results in a torque being applied to the actuator 28. A change in direction of the current through the coil 46 results in a change in direction of the torque applied to the actuator 28. It is contemplated that other magnet, VCM plate, coil and magnet support configurations may be utilized, such as a multiple coil arrangement, single or double VCM plates and a vertical coil arrangement.

Figure 3:
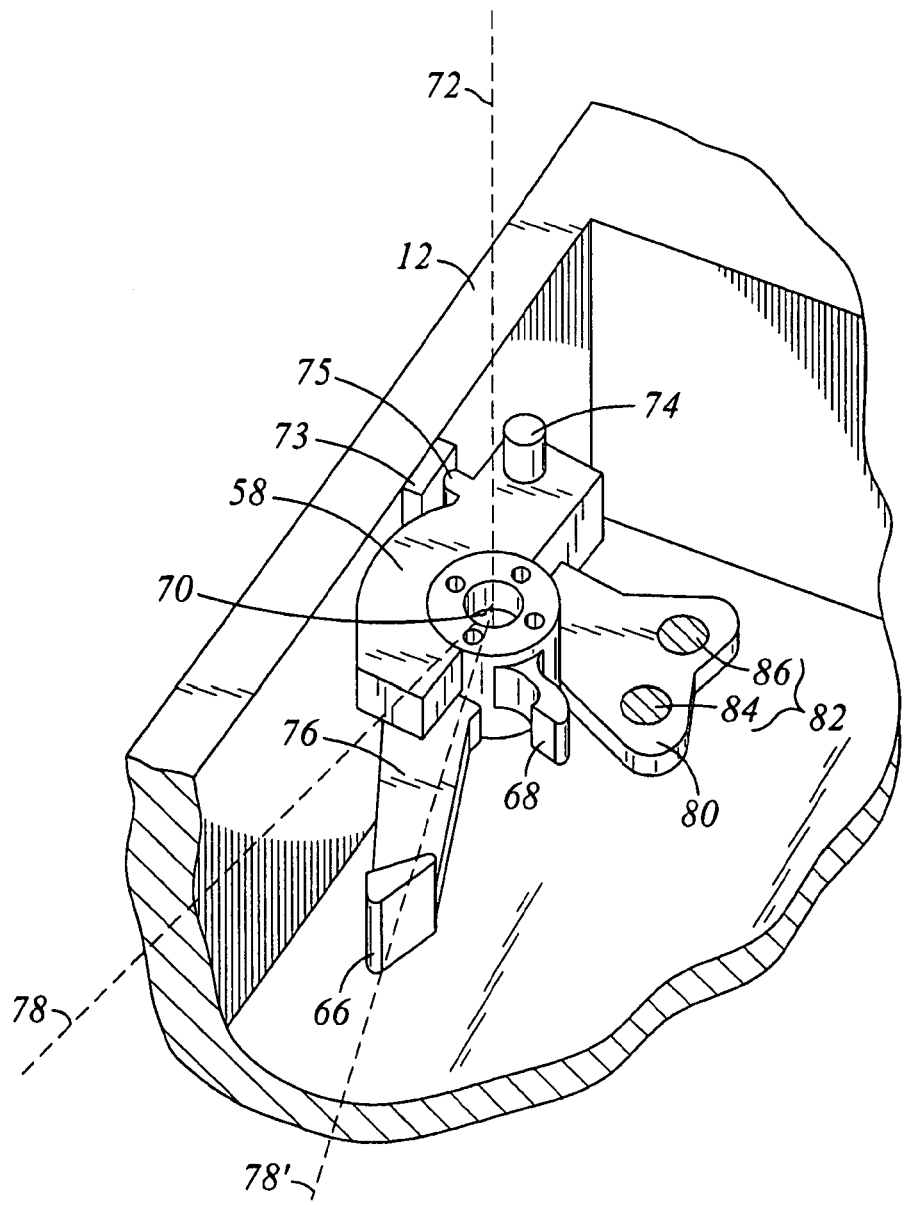
FIG. 3 is a top perspective view of a portion of the disk drive base and the actuator latch of FIG. 1.
Figure 4:
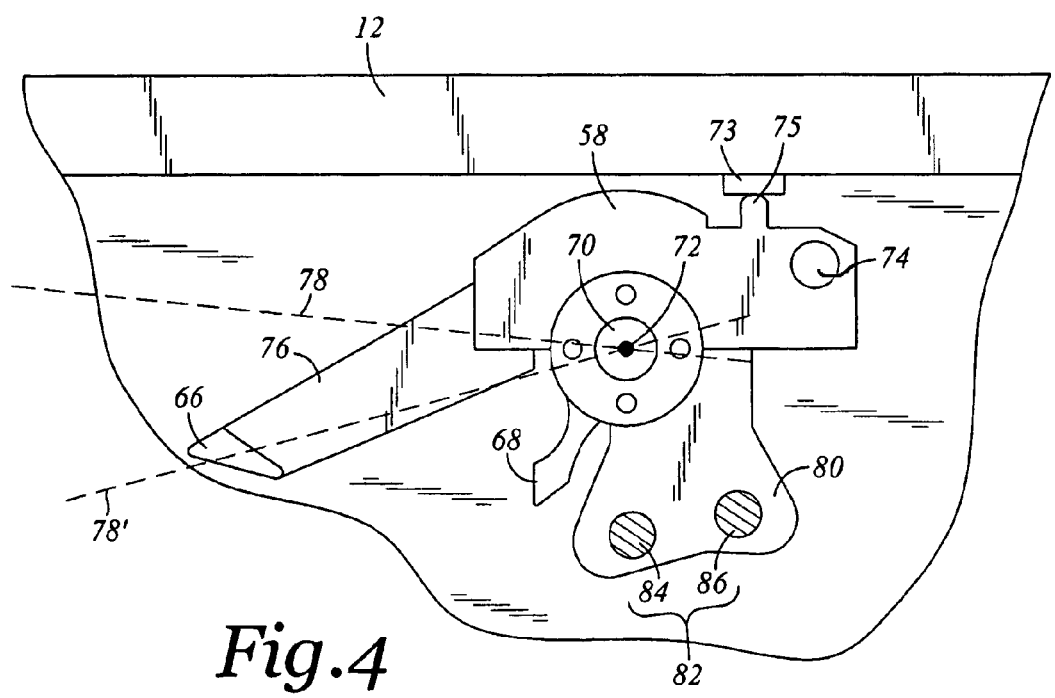
FIG. 4 is a top plan view of the portion of the disk drive base and the actuator latch of FIG. 3.
Figure 8:
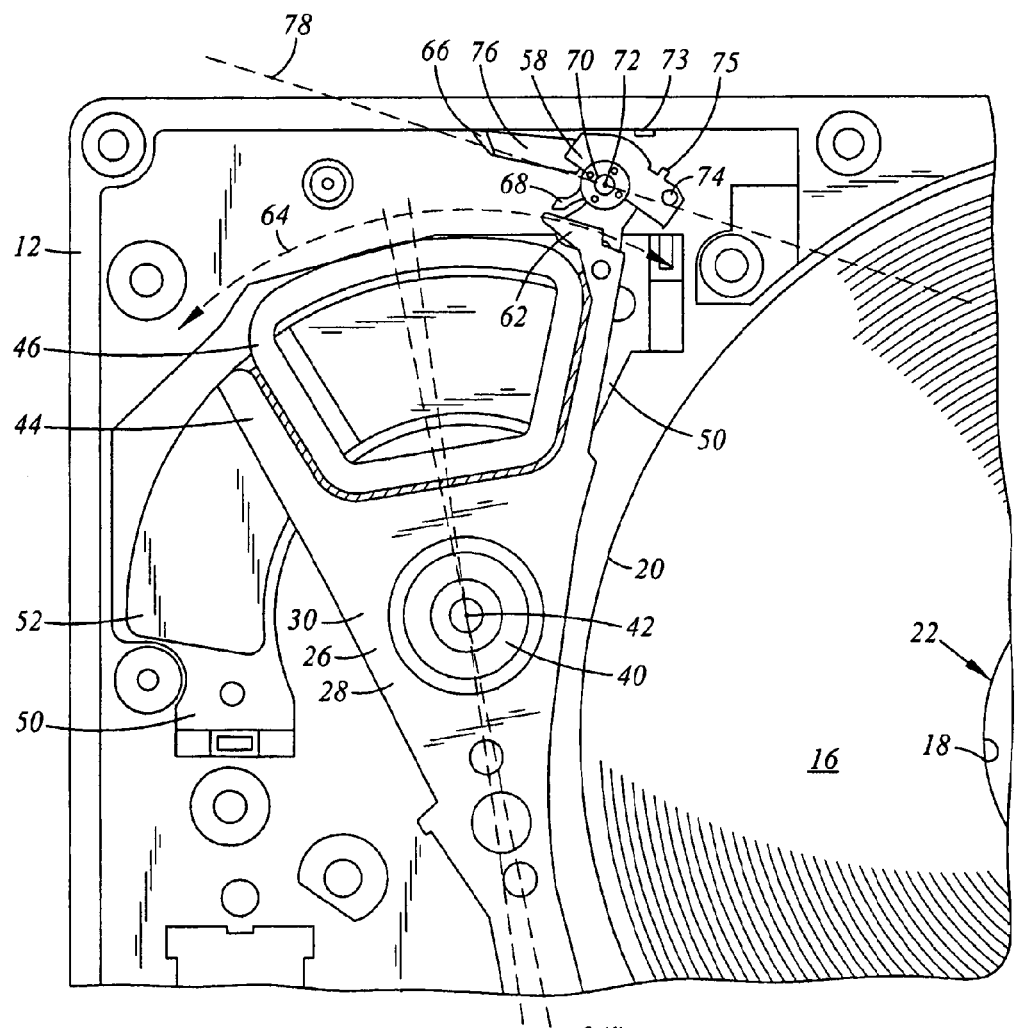
FIG. 8 is the top plan view of the portion of the disk drive of FIG. 7, however, with the actuator rotated to an intermediate position.
Figure 9:
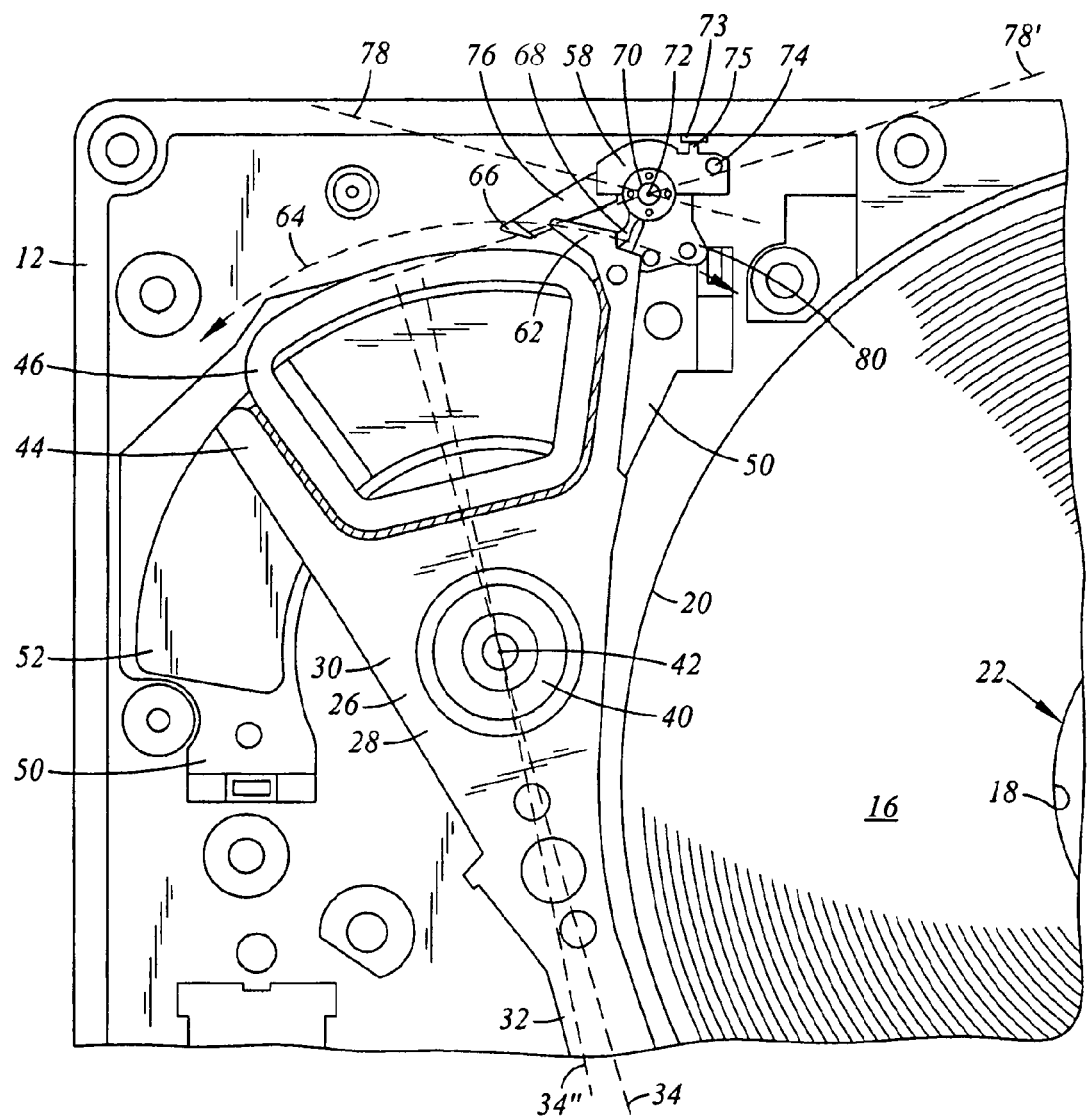
FIG. 9 is the top plan view of the portion of the disk drive of FIG. 8, however, with the actuator in a stop position and the actuator latch in a closed position.
Figure 10:
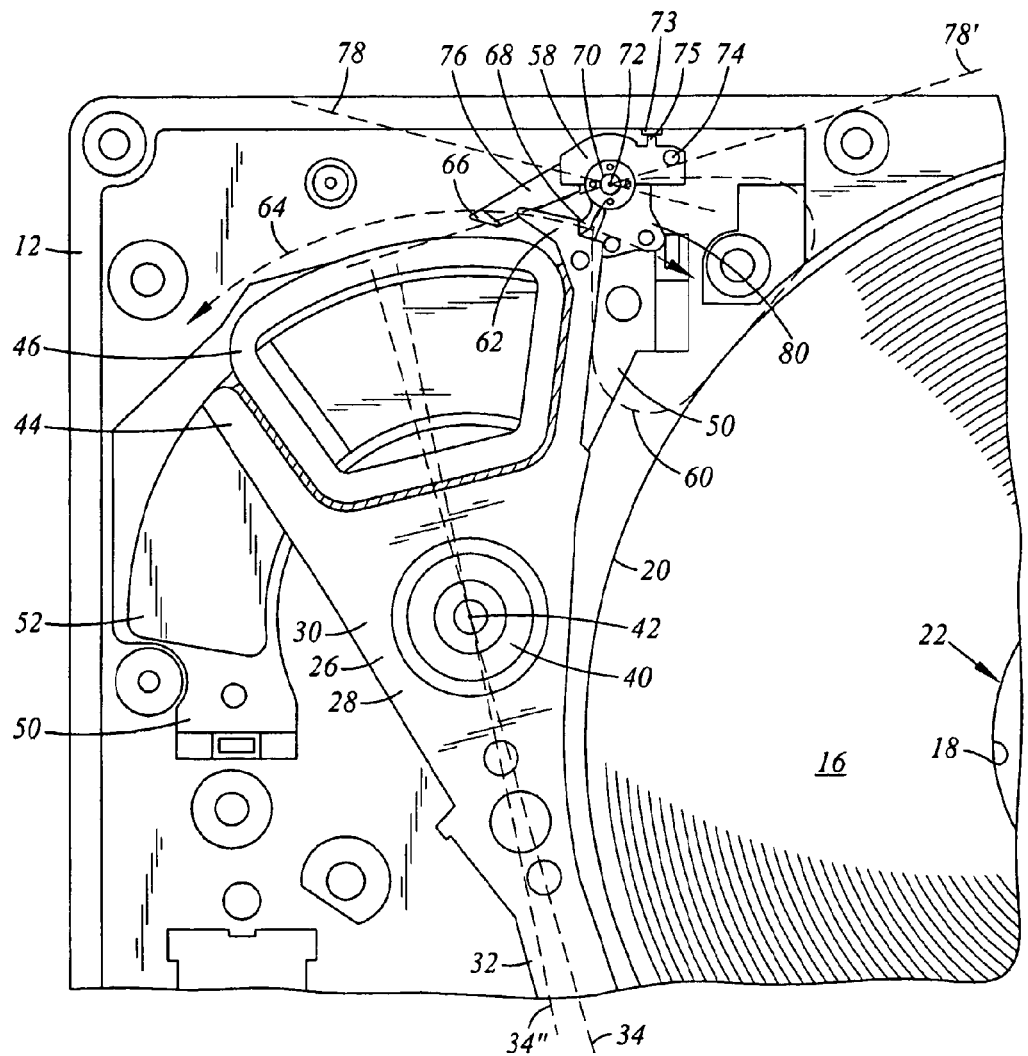
FIG. 10 is a top plan view of a portion of a disk drive according to an embodiment of the present invention.
Figure 11:
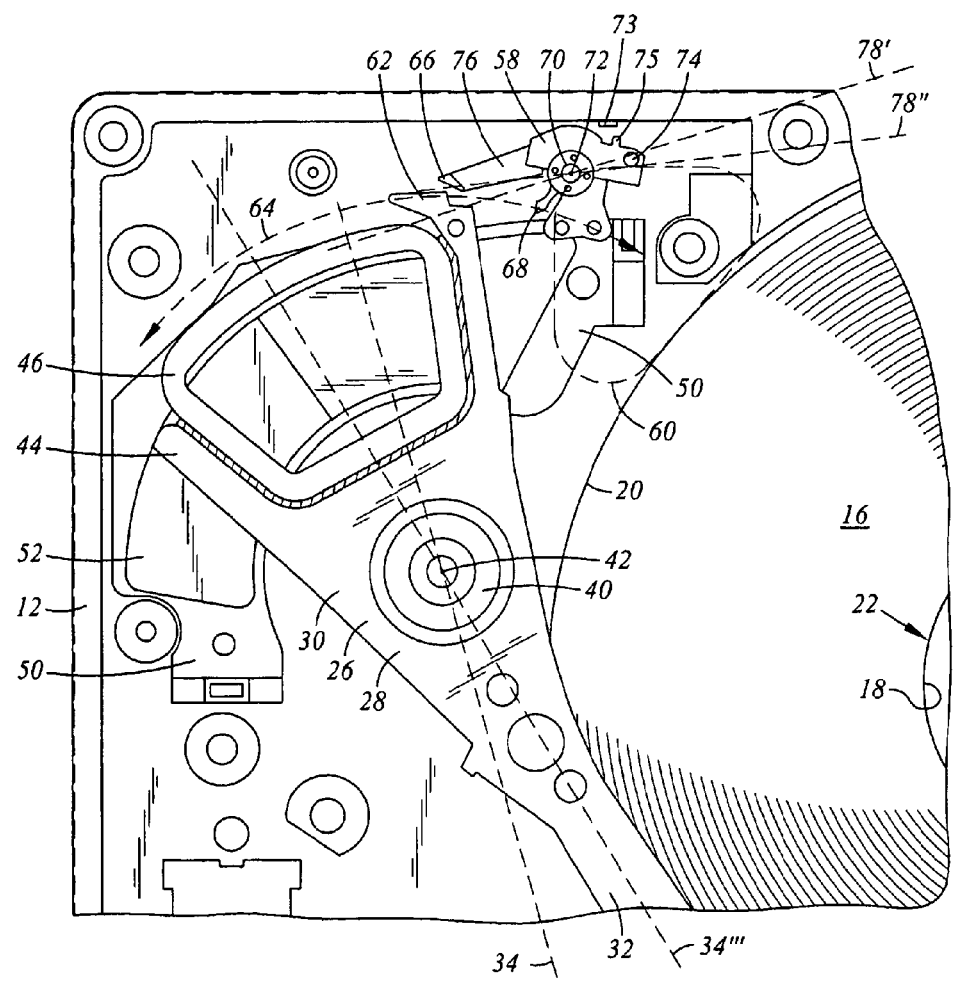
FIG. 11 is the top plan view of the portion of the disk drive of FIG. 10, however, with the actuator in another intermediate and the actuator latch in an open position.
Figure 12:
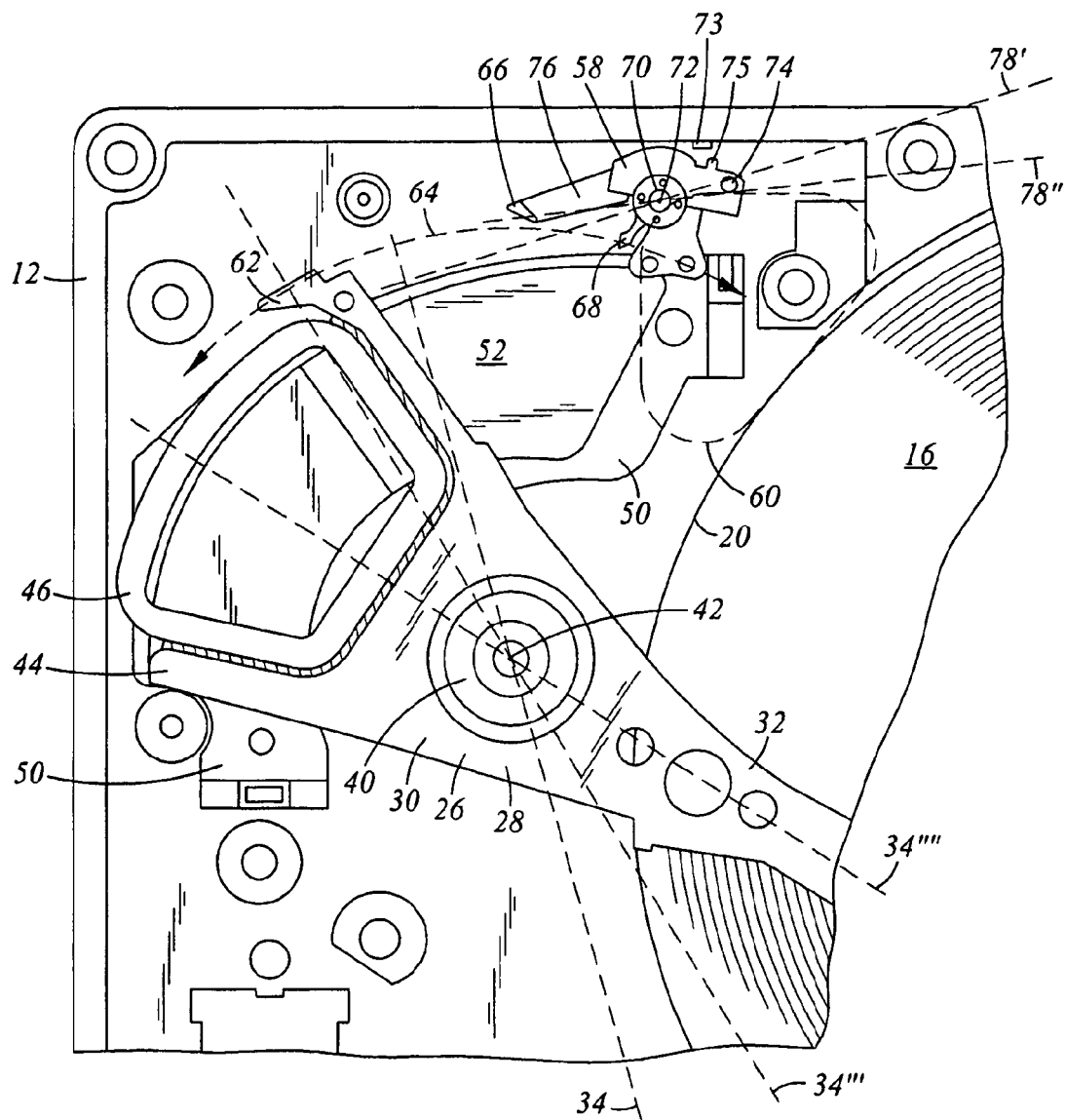
FIG. 12 is the top plan view of the portion of the disk drive of FIG. 10, however, with the actuator in an extreme rotational position.
Figure 13:
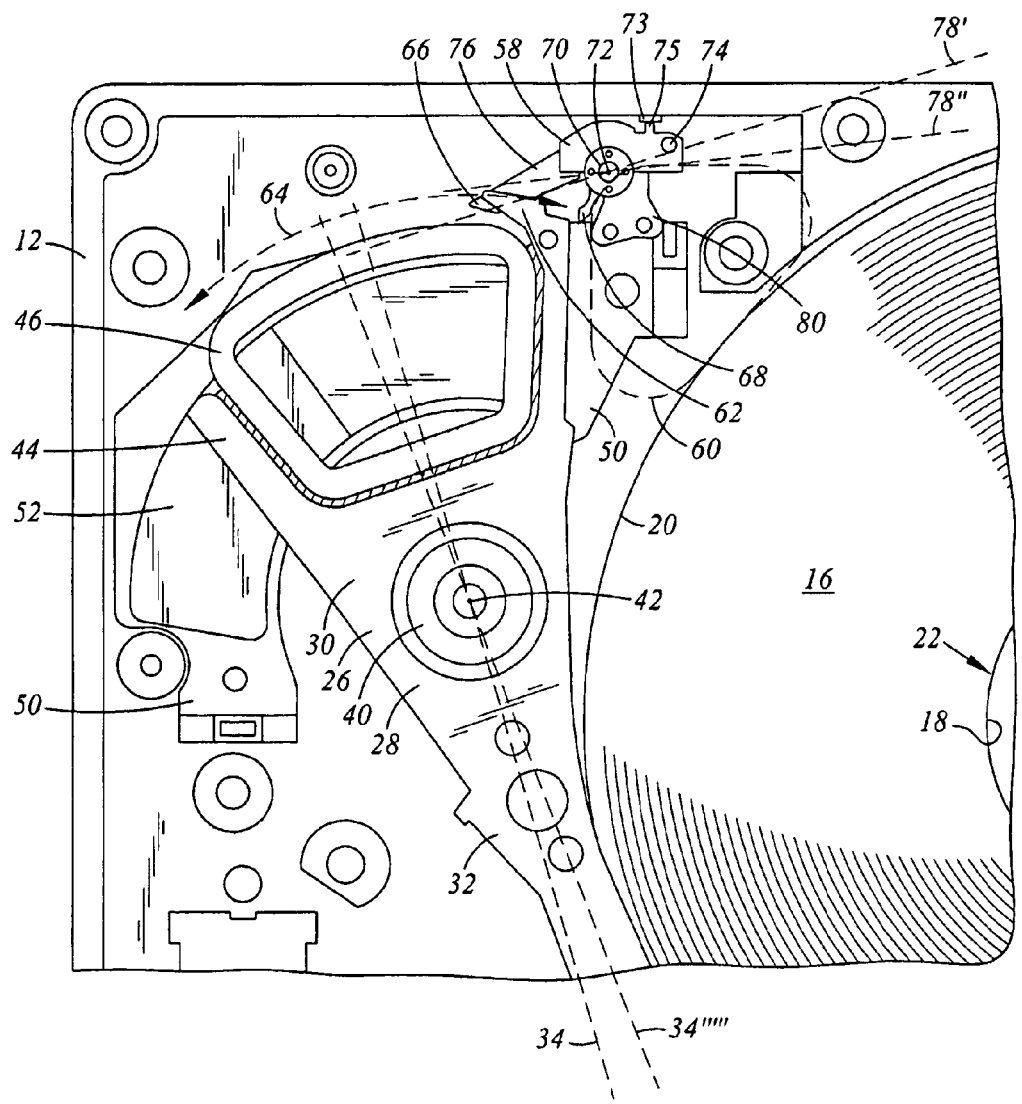
FIG. 13 is the top plan view of the portion of the disk drive of FIG. 9, however, with the actuator in a caught position.

As will be discussed in detail below, the disk drive 10 includes an actuator latch 58. Referring now to FIGS. 3 and 4, there is depicted the actuator latch 58 as installed with the disk drive base 12 as shown in perspective and top plan views. The actuator latch 58 is shown in a closed position. FIG. 5 is an enlarged top perspective view of a portion of the disk drive base 12 prior to installation of other disk drive components. FIG. 6 is the top plan view of the portion of the disk drive 10 of FIG. 5, however, with the actuator latch 58 installed in a defeat position. FIG. 7 is the top plan view of the portion of the disk drive of FIG. 6, however, with the actuator 28 installed. FIG. 8 is the top plan view of the portion of the disk drive 10 of FIG. 7, however, with the actuator 28 rotated to an intermediate position. FIG. 9 is the top plan view of the portion of the disk drive 10 of FIG. 8, however, with the actuator 28 in a stop position and the actuator latch in a closed position. FIG. 10 is a top plan view of a portion of a disk drive 10 having a fixed limiting member 60 of the cover 14, as indicated in dashed lining. FIG. 11 is the top plan view of the portion of the disk drive 10 of FIG. 10, however, with the actuator 28 in another intermediate position and the actuator latch 58 in an open position. FIG. 12 is the top plan view of the portion of the disk drive 10 of FIG. 11, however, with the actuator 28 in an extreme rotational position. FIG. 13 is the top plan view of the portion of the disk drive 10 of FIG. 9, however, with the actuator 28 in a caught position.

In the embodiments of FIGS. 1-13, the disk drive 10 includes the disk drive base 12, the fixed limiting member 60 coupled to the disk drive base 12, an actuator rotatably coupled to the disk drive base 12, and the actuator latch 58. The actuator 28 includes an actuator catch 62, and rotation of the actuator 28 defines an arcuate catch path 64 of the actuator catch 62. The actuator latch 58 is rotatably coupled to the disk drive base 12. The latch 58 is in contact with the fixed limiting member 60 with the latch 58 in an open position. The latch 58 is biased to rotate from the open position to the defeat position. The latch 58 includes a latch arresting portion 66 and a crash stop portion 68. The latch arresting portion 66 is disposed in the catch path 64 with the latch 58 in a closed position. The latch arresting portion 66 is not in the catch path 64 with the latch 58 in the open position, and the latch arresting portion 66 is not in the catch path 64 with the latch 58 in the defeat position. The crash stop portion 68 is in contact with the actuator 28 with the latch 58 in the closed position and with the actuator 28 in a stop position. The crash stop portion 68 is not in contact with the actuator 28 with the latch 58 in the defeat position.

As best seen in FIG. 5, the disk drive 10 may further comprise a latch post 70 extending from the disk drive base 12 such as seen in FIG. 5 (without the latch 58 installed about it). The latch post 70 and the disk drive base 12 may be a single component having material continuity as opposed to being an assembly of sub-components. The latch 58 may be disposed about the latch post 70 through a post hole in the latch 58. The latch post 70 may define a latch axis of rotation 72 about which the latch 58 is configured to rotate.

According to various embodiments and now referring to FIGS. 1-13, the latch 58 may be provided with a catch arm 76. The catch arm 76 may include the latch arresting portion 66. Though not required, the catch arm 76 and the latch arresting portion 66 may be a single component having material continuity rather than an assembly of subcomponents. The latch arresting portion 66 may be of various shapes and sizes and be configured to engage the actuator 28 in alternate ways. For example, the latch arresting portion 66 need not be configured to receive the actuator catch 62 which is in the form of a hook. The latch arresting portion 66 could be formed as a hook and the actuator catch 62 could be formed to receive such hook. It is contemplated that the actuator catch 62 may be of other configurations such a tang or pin. In the embodiment of FIG. 5, the latch arresting portion 66 (with the latch 58 in the closed position) is positioned along the catch path 64 of the actuator 28 such that contact between the latch arresting portion 66 and such a portion of the actuator 28 can occur so as to prevent rotational movement of the actuator 28 in a given direction.

As shown in FIGS. 6-8, the latch 58 includes a catch arm axis 78 indicating the rotational position of the latch 58 as being in a defeat position. As shown in FIGS. 1-4, 9-10 and 13, the latch 58 includes a catch arm axis 78' indicating the rotational position of the latch 58 as being in a closed position. As shown in FIGS. 11-12, the latch 58 includes a catch arm axis 78" indicating the rotational position of the latch 58 as being in an open position.

As mentioned above, the latch 58 is in contact with the fixed limiting member 60 with the latch 58 in the open position. This refers to the fixed limiting member 60 being contacted by the latch 58, provided the latch 58 is in the appropriate position, such as the open position as depicted in FIGS. 11 and 12. In the particular embodiment shown, an interference pin 74 of the latch 58 is in contact with the fixed limiting member 60 (indicated in dashed lining) of the cover 14. Thus, the latch 58 need not always be in contact with the fixed limiting member 60, rather the latch 58 is capable of contacting with the fixed limiting member 60. The contact between the latch 58 and the fixed limiting member 60 serves as a means for preventing the latch 58 from rotating from the open position to the defeat position despite the latch 58 being biased. The latch 58 may be prevented from rotating to the defeat position via other structures, such as a structure attached to the cover 14, a portion of the top VCM plate 48 (as will be discussed below in the context of the embodiment of FIGS. 14 and 15), or a protrusion extending from the disk drive base 12, for examples.

The crash stop portion 68 and other portions of the latch 58, such as the catch arm 76, may all be a single component having material continuity rather than an assembly of sub-components. As mentioned above, the crash stop portion 68 is in contact with the actuator 28 with the latch 58 in the closed position and with the actuator 28 in a stop position. This refers to the crash stop portion 68 being contacted by the actuator 28, provided the actuator 28 is in the appropriate position, such as the stop position as depicted in FIGS. 1-4 and 9-10. Thus, the actuator 28 need not always be in contact with the crash stop portion 68, rather the actuator 28 is capable of contacting with the crash stop portion 68.

The latch 58 is biased to a defeat position. In the embodiment shown, the latch 58 is further biased to the open position as well. In the plan views of FIGS. 2, 4, and 6-13 the latch 58 is biased to rotate in a clockwise direction about the latch axis of rotation 72. In this embodiment, the latch 58 includes a biasing element support 80 and a latch biasing element 82 is supported by the biasing element support 80. The latch biasing element 82 is shown as including first and second biasing portions 84, 86. The latch biasing element 82 in the form of the first and second biasing portions 84, 86 may each comprise a ferromagnetic metal material, such as a steel ball bearing (e.g. 400 series stainless steel). The latch biasing element 82 may be magnetically attracted towards the VCM magnet 52. Such magnetic interaction with the latch biasing element 82 results in a biasing force upon the latch 58. The first and second biasing portions 84, 86 are angularly disposed with regard to the latch axis of rotation 72. This facilitates a relatively larger angular range of rotation within which biasing forces may influence rotation of the latch 58 in comparison to positioning the first and/or second biasing portions 84, 86 at a singular angular position with regard to the latch axis of rotation 72. Other biasing techniques for the latch 58 may be implemented. For example, a mechanical spring may be attached between the latch 58 and the disk drive base 12.

As mentioned above, the disk drive 10 includes the fixed limiting member 60. In the embodiment shown, the fixed limiting member 60 is a portion of the cover 14. As used herein, the term "fixed" refers to being in fixed spatial relation to the disk drive base 12. The fixed limiting member 60 is depicted as a stamped feature in the cover 14. When the disk drive 10 is fully assembled, the cover 14 is attached to the disk drive base 12. The fixed limiting member 60 and the cover 14 may both be a single component having material continuity rather than an assembly of subcomponents. This can serve to reduce the number of components and avoid assembly of such components. However, the fixed limiting member 60 may be a separately formed piece of material which is attached to the cover 14. In the embodiment of FIG. 1, the fixed limiting member 60 maintains its position relative to the disk drive base 12.

An example sequence of assembly of the disk drive 10 will now be discussed beginning with FIG. 5. As is shown, there is depicted a portion for the disk drive base 12. Referring now to FIG. 6, the latch 58 is installed about the latch post 70. As is depicted, the latch 58 assumes the defeat position due to the magnetic interaction between the latch biasing element 82 and the VCM magnet 52.

Referring now to FIG. 7, the actuator 28 is attached to the disk drive base 12 with the arm longitudinal axis 34' indicating an initial installation angular position. Because the latch 28 is biased, the latch 28 is shown as being fully rotated clockwise. In this embodiment, the latch arresting portion 66 is in contact with the disk drive base 12 and such contact limits further rotation of the latch 58 in the defeat position. There is no need to rotate the latch 58 for insertion of the actuator 28 in the disk drive base 12 because the crash stop portion 68 is rotated out of the way. The actuator 28 is positioned with the heads 38 radially beyond the outer diameter 20 of the disks 16.

Referring now to FIG. 8, the actuator 28 is rotated counter-clockwise relative to its initial positioning as shown in FIG. 7. The actuator 28 is rotated and the actuator has the arm longitudinal axis 34'' indicating an intermediate angular position. The crash stop portion 68 is clear of contact with the actuator catch 62. However, in other embodiments where the actuator catch 62 is in contact with a backside of the crash stop portion 68, it may be necessary to elastically bend or flex the crash stop portion 68 to allow the positioning of the actuator 28 and its actuator catch 62.

Referring now to FIG. 9, the actuator 28 is rotated counter-clockwise relative to its positioning as shown in FIG. 8. The actuator 28 is rotated with the arm longitudinal axis 34 indicating the stop or parked position. The parked position is the disposition that the actuator 28 is configured to come to rest when not performing read or write operations. Further, the latch 58 is rotated with the catch arm axis 78' indicating the closed position of the latch 28. The crash stop portion 68 is disposed in the catch path 64 with the latch 58 in the closed portion. The latch 58 is depicted in a closed position and is rotated fully in a counter-clockwise direction. An interference between the latch 58 and the disk drive base 12 prevents further counter-clockwise rotation of the latch 58. In the embodiment shown, the disk drive base 12 may include a pad 73 and the latch 58 may include a stopper 75 that contacts the pad 73 when the latch 58 is in the closed position.

A next step in the assembly process of the disk drive 10 is the installation of the top VCM plate 48. However, the top VCM plate 48 is not depicted in this series of figures so as to facilitate illustration of the latch 58 and the actuator 28. In a final step in the assembly of the disk drive 10, the cover 14 may be attached to the disk drive base 12. Referring now to FIG. 10 the fixed limiting member 60 of the cover 14 is indicated in dashed lining. It is understood that the cover 14 is not shown in this view so as to facilitate the illustration of the latch 58 and the actuator 28.

Referring now to FIG. 11, there is depicted the actuator 28 in an example operable position with the heads 38 positioned somewhere between the inner diameter 18 and the outer diameter 20 of each of the disks 16. The actuator 28 is shown as having been rotated counter-clockwise from the parked position. The actuator 28 is rotated with an arm longitudinal axis 34''' indicating an operable position. Further, the latch 58 is rotated with a catch arm axis 78'' indicating an open position of the latch 28.

It is assumed that the actuator 28 has been rotated by a controlled VCM induced movement during normal operation of the actuator 28 in performing its read or write operations. As the actuator 28 rotates away from the parked position, the latch 58 also begins to rotate from the closed position in a clockwise direction. This is because, in the particular embodiment shown, the latch 58 is biased to the open position. As such, by the time the actuator catch 62 of the actuator 28 is rotated near the location of the latch arresting portion 66, the latch 58 has rotated to the open position with the latch arresting portion 66 not in the catch path 64. In this embodiment, the latch arresting portion 66 is positioned radially further than the catch path 64 and is not capable of contacting the actuator catch 82 of the actuator 28.

Referring now to FIG. 12, there is depicted the actuator 28 having been fully rotated in a counter-clockwise direction with the heads 38 adjacent the inner diameter 18. The actuator 28 is positioned with an arm longitudinal axis 34''' indicating this extreme rotational position of the actuator 28.

It is contemplated that the disk drive 10 may be exposed to external forces, such as a mechanical shock event. Where the actuator 28 is in the parked position, such an external force may result in a relatively substantial rotational acceleration having a component about an axis that is parallel to the axis of rotation 42. Where the direction of such rotational acceleration component is such that the disk drive 10 rotates in a clockwise direction (as seen in the views of FIGS. 1 and 2), the actuator 28 would tend to rotate in a counter-clockwise direction. Rotation of the actuator 28 in such a direction would tend to result in the heads 38 being undesirably moved over the disks 16 in a rapid uncontrolled manner (possibly causing detrimental contact between the heads 38 and the disks 16).

However, referring now to FIG. 13, when the actuator 28 is rapidly rotated under such conditions, the actuator 28 becomes latched with the actuator catch 62 being in contact with the latch arresting portion 66 of the latch 58 such as shown. The actuator 28 has an arm longitudinal axis 34' ''indicating a caught position. This is because the latch 58 is still in the closed position (indicated by the catch arm axis 78') and the biasing force is not strong enough to rotate the latch 58 to the open position by the time the actuator 28 is rotated. It is contemplated that the sensitivity of the biasing of the latch 58 to the open position may be adjusted to correspond to the degree of shock induced rotational acceleration that may be experienced by the disk drive 10. For example, where the latch biasing element 82 is in the form of a ferromagnetic metal, the type, amount and distance from the VCM magnet 52 may be adjusted by design.

Figure 14:
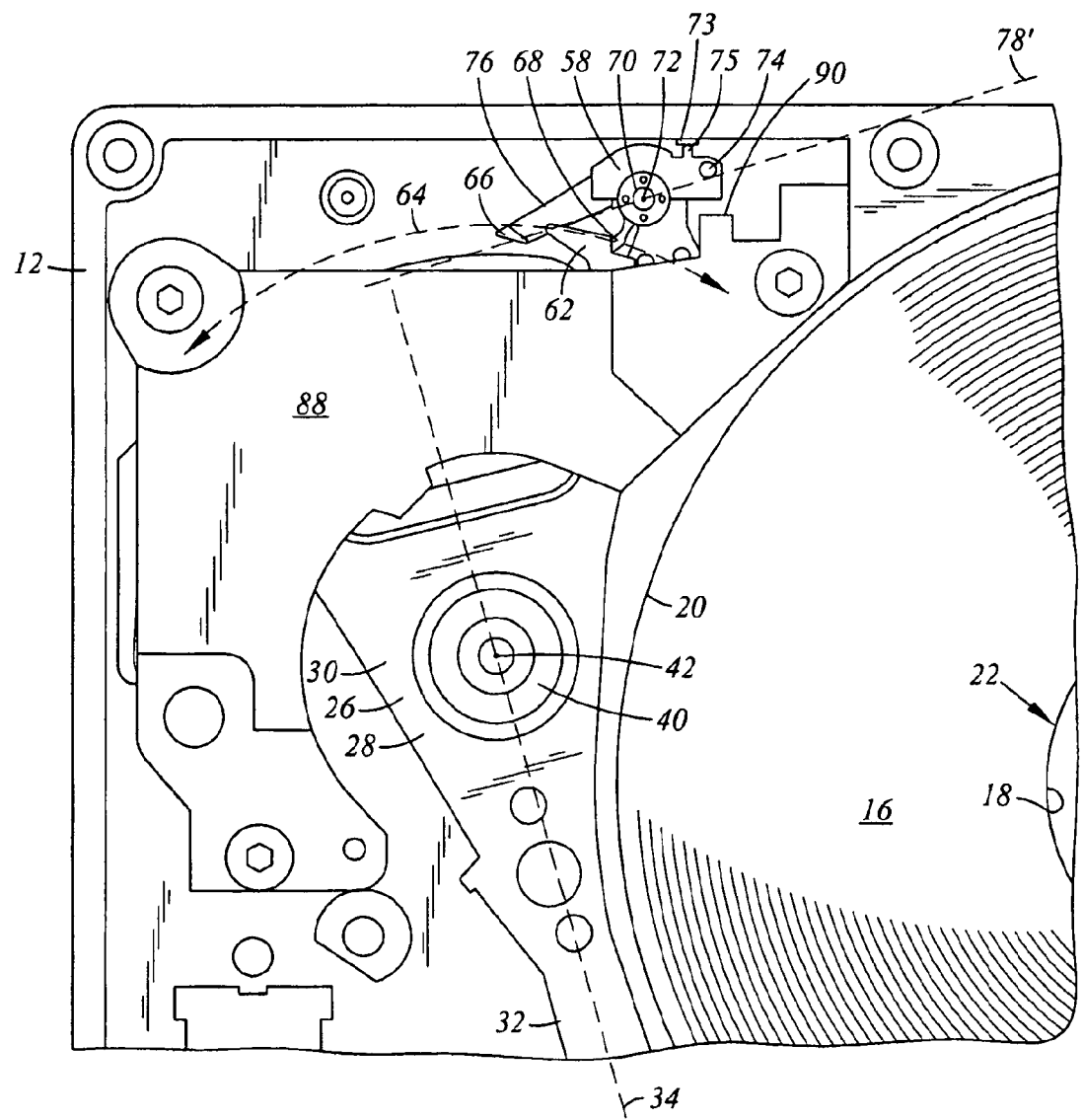
FIG. 14 is a top plan view of the portion of the disk drive according to another embodiment with a fixed limiting member of a VCM top plate.
Figure 15:
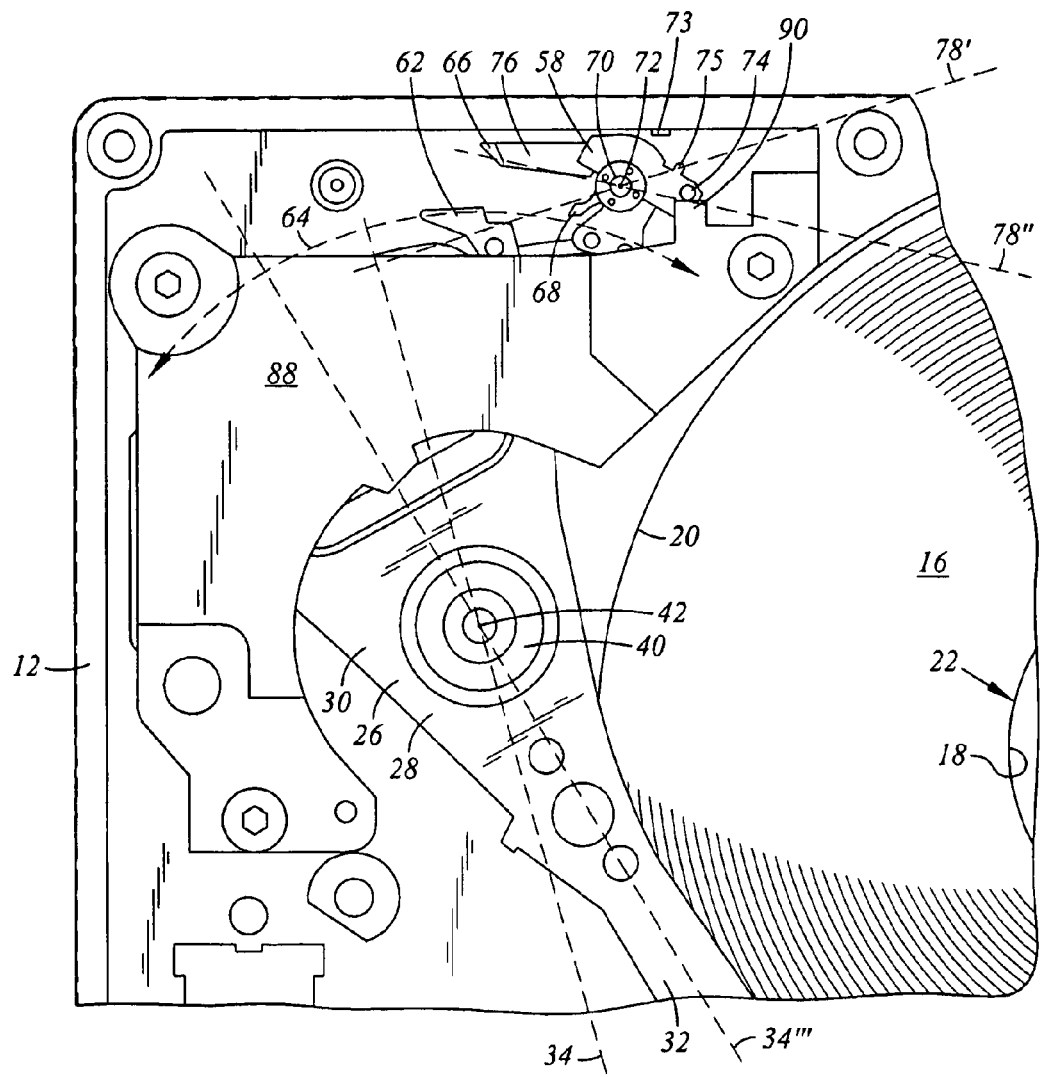
FIG. 15 is a top plan view of the portion of the disk drive of FIG. 14, however with an actuator in a caught position and an actuator latch in a closed position.

Referring now to FIGS. 14 and 15, there is depicted another embodiment. Similar reference numerals as those in relation to the embodiments shown in FIGS. 1-13 are used to indicate similarly configured components, however, with differences as noted below. FIG. 14 depicts a top plan view similar to a portion of the disk drive 10 of FIG. 9. The actuator 28 is in the parked position and the latch 58 is in the stop position. However, in this embodiment, there is depicted a top VCM plate 88 that includes a fixed limiting member 90.

FIG. 15 depicts a top plan view of the disk drive 10 with the actuator 28 having been rotated counter-clockwise. As the latch 58 is biased to rotate to the open position, the latch 58 rotates clockwise (in this view). Because of the positioning of the fixed limiting member 90, the interference pin 74 of the latch 58 comes into contact with the fixed limiting member 90. Though not required, the fixed limiting member 90 and a remainder of the top VCM plate 88 may be a single component having material continuity rather than an assembly of subcomponents.

According to another aspect of the present invention, there is provided a method of reworking a disk drive, such as the disk drive 10. The method includes removing a fixed limiting member, such as the fixed limiting member 60, from the disk drive 10 during a reworking period. In an embodiment of the disk drive 10 as depicted in FIGS. 1-13, this would simply include removing the cover 14, as the fixed limiting member 60 is a feature of the cover 14.

The method further provides for allowing the latch 58 to biasedly move to a defeat position from an open position during the period. The actuator 28 may be rotated to counter-clockwise. This may be done through a manual procedure for example. Because the latch 58 is biased, controlled manual rotation the actuator 28 from the parked position will allow the latch 58 to rotate in a clockwise direction from the stop position to the defeat position. This is because the fixed limiting member 60 is no longer present to contact the interference pin 74 and limit its clockwise rotation.

The method further provides for removing the actuator 28 from the disk drive 10 including translating the actuator 28 in a direction parallel to the axis of rotation 42 of the actuator 28 during the period. At this point, the actuator 28 may be rotated clockwise. For example, the actuator 28 may be rotated to an extreme rotational position with the heads 38 disposed radially beyond the outer diameter 20 of the disks 16. As such, the actuator 28 and the latch 58 may be as shown in FIG. 7. Next the actuator 58 is separated from the disk drive 10 by lifting it vertically along the axis of rotation 42.

The method further provides for replacing the actuator 28 with a replacement actuator into the disk drive 10 including translating the replacement actuator in a direction parallel to an actuator axis of rotation of the replacement actuator during the period. The latch 58 is never removed from the disk drive 10 during the period. The replacement actuator may be a new actuator or simply the same actuator 28 after having been repaired or otherwise refurbished.

The utilization of the latch 58 facilitates an ease of removal of the actuator 58 as the latch 58 is not required to be removed to allow the actuator 58 to be removed. Rather, the latch 58 undergoes biased movement to the defeat position, thereby positioning itself in a position which would not interfere with the removal of the actuator 58.

What is claimed is:

1. A disk drive comprising:
    a disk drive base;
    a fixed limiting member coupled to the disk drive base;
    an actuator rotatably coupled to the disk drive base, the actuator including an actuator catch, rotation of the actuator defining an arcuate catch path of the actuator catch; and
    an actuator latch rotatably coupled to the disk drive base, the latch in contact with the fixed limiting member with the latch in an open position, the latch being biased to rotate from the open position to a defeat position, the latch comprising:
    a latch arresting portion disposed in the catch path with the latch in a closed position, the latch arresting portion not in the catch path with the latch in the open position, the latch arresting portion not in the catch path with the latch in the defeat position; and
    a crash stop portion in contact with the actuator with the latch in the closed position and with the actuator in a stop position, the crash stop portion not in contact with the actuator with the latch in the defeat position.

2. The disk drive of claim 1 wherein the latch includes an interference pin, the interference pin contacting the fixed limiting member with the latch in the open position.

3. The disk drive of claim 1 further comprising:
    means for preventing the latch from rotating from the open position to the defeat position despite the latch being biased.

4. The disk drive of claim 3 wherein the means for preventing the latch from rotating includes interference between the fixed limiting member and an interference pin of the latch.

5. The disk drive of claim 1 wherein the fixed limiting member comprises a top VCM plate.

6. The disk drive of claim 1 wherein the fixed limiting member comprises a disk drive cover.

7. The disk drive of claim 1 wherein the latch is also biased to rotate from the closed position to the open position.

8. The disk drive of claim 1 wherein the latch further includes a latch biasing element comprising a ferromagnetic metal material.

9. The disk drive of claim 8 further comprising a VCM magnet disposed adjacent the actuator, the latch biasing element being magnetically attracted towards the VCM magnet.

10. The disk drive of claim 9 wherein the latch biasing element comprises a first biasing portion and a second biasing portion separated from the first biasing portion.

11. The disk drive of claim 1 wherein the actuator has an actuator axis of rotation, the latch arresting portion being disposed radially further from the actuator axis of rotation in the open position than in the closed position.

12. The disk drive of claim 11 wherein the arresting portion being disposed radially further from the actuator axis of rotation in the defeat position than in the closed position.

13. The disk drive of claim 11 wherein the latch arresting portion being disposed radially further from the actuator axis of rotation in the defeat position than in the open position.

* * * * *